United States Patent
Wang

[11] Patent Number: 5,378,518
[45] Date of Patent: Jan. 3, 1995

[54] AUTOMOBILE SUN-PROOF SHADE

[76] Inventor: Kuei-Ling Wang, No. 174, Lane 131, Sec. 2, True Hsing Rd., Panchiao, Taipei, Taiwan, Prov. of China

[21] Appl. No.: 136,774

[22] Filed: Oct. 14, 1993

[51] Int. Cl.$^6$ .............................................. B60J 3/00
[52] U.S. Cl. .................................... 428/65; 296/97.1; 296/97.2; 428/201; 428/209
[58] Field of Search .......................... 428/65, 201, 209; 296/97.1, 97.2

Primary Examiner—Alexander S. Thomas
Attorney, Agent, or Firm—Bucknam and Archer

[57] ABSTRACT

An automobile sun-proof shade comprised of a bottom layer of polyester coated with a layer of aluminum reflector coating on the outside, a top layer of polyester coated with a layer of aluminum reflector coating on the outside and covered on the bottom layer, and a resilient metal ring sealed between the top and bottom layers through a high frequency heat sealing process.

1 Claim, 1 Drawing Sheet

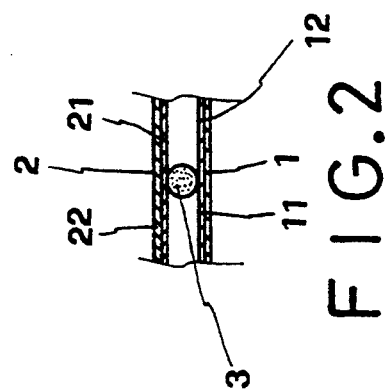
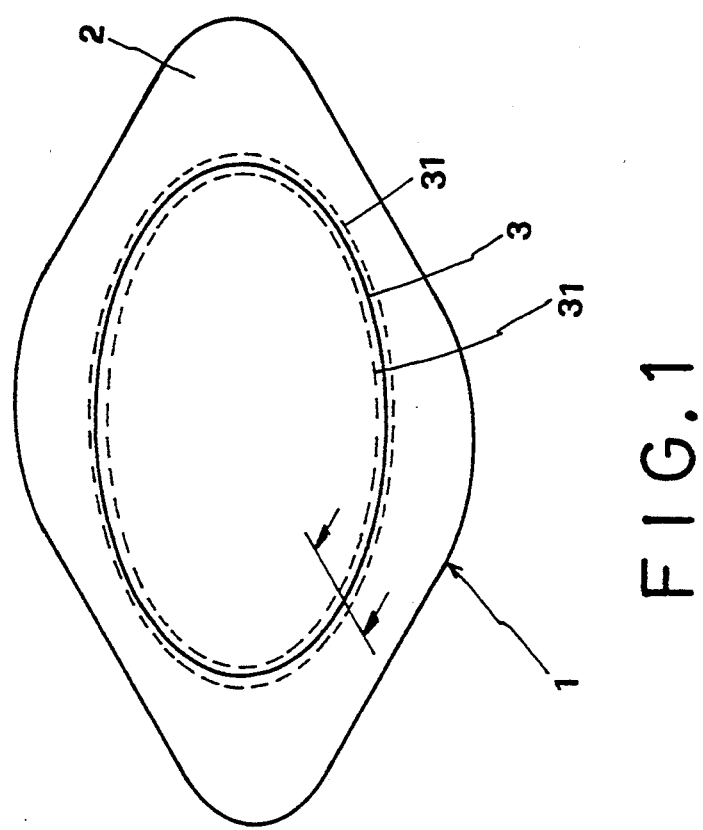

AUTOMOBILE SUN-PROOF SHADE

BACKGROUND OF THE INVENTION

The present invention relates to a sun-proof shade for automobiles which stops sun glare, cuts air-conditioning costs and protects against the radiating heat of the sun.

Various sun-proof shades have been disclosed for automobiles, and have appeared on the market. These sun-proof shades are commonly designed to stop sun glare. Few of these sun-proof devices can effectively protect against the radiating heat of the sun. Further, these sun-proof shades and screens are not durable in use because the cloth of the shades may tear off and the threads thereof may disconnect from the binding metal rods easily.

SUMMARY OF THE INVENTION

The present invention has been accomplished to provide an automobile sun-proof shade which eliminates the aforesaid disadvantages. The sun-proof shade in accordance with the preferred embodiment of the present invention is comprised of two overlapped layers of polyester respectively coated with an aluminum reflector coating on the outside, and a resilient metal ring sealed between the overlapped layers of polyester through a high frequency heat sealing process.

BRIEF DESCRIPTION OF THE DRAWINGS

FIG. 1 is a perspective view of an automobile sun-proof shade according to the preferred embodiment of the present invention; and FIG. 2 is a cross section taken on FIG. 1 showing the metal ring retained between the top and bottom layers of the automobile sun-proof shade.

DETAILED DESCRIPTION OF THE PREFERRED EMBODIMENT

Referring to FIGS. 1 and 2, a sun-proof shade in accordance with the present invention is generally comprised of a bottom layer 1, a top layer 2, and a metal ring 3. The bottom layer 1 is made of a piece of polyester cloth 11 having an outer surface coated with a layer of aluminum reflector film 12 formed through a steam plating process for protection against the radiating heat of the sun. The top layer 2 is made of a piece of polyester cloth 21 having an outer surface coated with a layer of aluminum reflector film 22 formed through a steam plating process for protection against the radiating heat of the sun. The metal ring 3 is made from a resilient metal in size and shape fitting over the window of the automobile to be protected. During the production, the metal ring 3 is retained between the top layer 2 and the bottom layer 1, and then two endless seams 31 are formed through a high-frequency heat sealing process between the bottom and top layers 1;2 around the metal ring 3 on the inside and the outside respectively. The border area of the bottom and top layers 1;2 are sealed through a high-frequency heat sealing process. As the bottom and top layers 1;2 are sealed together and the metal ring 3 is sealed within the bottom and top layers 1;2, the sun-proof shade is tear-proof.

While only one embodiment of the present invention has been shown and described, it will be understood that various modifications and changes could be made without departing from the spirit and scope of the invention.

What is claimed is:

1. An automobile sun-proof shade comprising:
   a bottom layer made of a piece of polyester cloth having an outer surface coated with a layer of aluminum reflector film formed through a steam plating process;
   a top layer made of a piece of polyester cloth having an outer surface coated with a layer of aluminum reflector film formed through a steam plating process, said top layer being covered on said bottom layer and peripherally sealed through a high frequency heat sealing process; and
   a metal ring made of resilient metal and sealed between said bottom layer and said top layer by two endless seams being formed between said bottom layer and said top layer around said metal ring on the inside and the outside respectively through a high frequency heat sealing process.

* * * * *